United States Patent
Liebner et al.

(10) Patent No.: US 12,528,474 B2
(45) Date of Patent: Jan. 20, 2026

(54) METHOD AND DEVICE FOR POSE DATA RELATING TO POSE OF A VEHICLE

(71) Applicant: Bayerische Motoren Werke Aktiengesellschaft, Munich (DE)

(72) Inventors: Martin Liebner, Munich (DE); David Pannen, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 35 days.

(21) Appl. No.: 18/729,553

(22) PCT Filed: Jan. 16, 2023

(86) PCT No.: PCT/EP2023/050809
§ 371 (c)(1),
(2) Date: Jul. 17, 2024

(87) PCT Pub. No.: WO2023/139010
PCT Pub. Date: Jul. 27, 2023

(65) Prior Publication Data
US 2025/0115251 A1 Apr. 10, 2025

(30) Foreign Application Priority Data
Jan. 24, 2022 (DE) .................... 10 2022 101 492.4

(51) Int. Cl.
*B60W 40/112* (2012.01)
*B60W 50/00* (2006.01)

(52) U.S. Cl.
CPC .......... *B60W 40/112* (2013.01); *B60W 50/00* (2013.01); *B60W 2050/0033* (2013.01);
(Continued)

(58) Field of Classification Search
CPC .... B60W 40/112; B60W 40/11; B60W 50/00; B60W 2050/033; B60W 2420/403;
(Continued)

(56) References Cited

U.S. PATENT DOCUMENTS

| 6,073,077 A | 6/2000 | Hsu |
| 11,150,093 B1 | 10/2021 | Kasevich et al. |

(Continued)

FOREIGN PATENT DOCUMENTS

| CN | 104061932 A | 9/2014 |
| DE | 10 2009 031 268 A1 | 1/2011 |

(Continued)

OTHER PUBLICATIONS

International Search Report (PCT/ISA/210) issued in PCT Application No. PCT/EP2023/050809 dated Apr. 24, 2023 with English translation (7 pages).
(Continued)

*Primary Examiner* — George C Jin
(74) *Attorney, Agent, or Firm* — Crowell & Moring LLP

(57) ABSTRACT

A device for determining positional information relating to the position of a vehicle is configured to determine a measured value of an acceleration vector of the vehicle, and to determine a value of a dynamic component of the measured value of the acceleration vector caused by a movement of the vehicle. The device is further configured to determine an estimated value of the gravity vector based on the measured value of the acceleration vector and based on the value of the dynamic component, and to determine positional data relating to the position of the vehicle based on the estimated value of the gravity vector.

14 Claims, 2 Drawing Sheets

(52) U.S. Cl.
CPC . *B60W 2420/403* (2013.01); *B60W 2420/905* (2013.01); *B60W 2520/105* (2013.01); *B60W 2520/18* (2013.01); *B60W 2520/28* (2013.01)

(58) Field of Classification Search
CPC ..... B60W 2420/905; B60W 2520/105; B60W 2520/18; B60W 2520/28; B60W 2520/10; B60W 2520/125
See application file for complete search history.

(56) References Cited

U.S. PATENT DOCUMENTS

| | | | |
|---|---|---|---|
| 2008/0319589 A1* | 12/2008 | Lee | B60W 40/12 |
| | | | 701/1 |
| 2012/0022780 A1* | 1/2012 | Kulik | G01C 22/025 |
| | | | 701/498 |
| 2017/0137023 A1* | 5/2017 | Anderson | B60W 50/14 |
| 2018/0045519 A1 | 2/2018 | Ghadiok et al. | |
| 2018/0136665 A1 | 5/2018 | Mudalige et al. | |
| 2018/0186371 A1* | 7/2018 | Sterniak | B62D 5/04 |
| 2019/0092223 A1 | 3/2019 | Buhmann et al. | |
| 2019/0283760 A1* | 9/2019 | Jensen | B60W 40/10 |
| 2019/0344738 A1 | 11/2019 | Ga et al. | |

FOREIGN PATENT DOCUMENTS

| | | |
|---|---|---|
| DE | 10 2017 126 925 A1 | 5/2018 |
| DE | 10 2017 216 945 A1 | 3/2019 |
| DE | 10 2018 220 043 A1 | 11/2019 |
| EP | 3 922 526 A1 | 12/2021 |
| WO | WO 2016/042296 A2 | 3/2016 |

OTHER PUBLICATIONS

German-language Written Opinion (PCT/ISA/237) issued in PCT Application No. PCT/EP2023/050809 dated Apr. 24, 2023 with English translation (8 pages).

German-language Search Report issued in German Application No. 10 2022 101 492.4 dated Nov. 8, 2022 with partial English translation (11 pages).

Xiong, L. et al., "IMU-Based Automated Vehicle Slip Angle and Attitude Estimation Aided by Vehicle Dynamics", Sensors, Apr. 24, 2019, pp. 1-28, vol. 19, No. 8, XP093029025 (28 pages).

Liebner, M. et al., "Crowdsourced HD Map Patches Based on Road Model Inference and Graph-Based SLAM", IEEE Intelligent Vehicles Symposium, Jun. 9-12, 2019, pp. 1211-1218, XP093029073 (8 pages).

* cited by examiner

METHOD AND DEVICE FOR POSE DATA RELATING TO POSE OF A VEHICLE

BACKGROUND AND SUMMARY

The invention relates to a method and a corresponding device for determining pose data relating to the pose, in particular relating to the roll angle, of a vehicle.

The sensor data relating to the environment of a vehicle that are recorded by the vehicle can be used to map the environment of the vehicle and to localize the vehicle within the environment. For this purpose, a SLAM (Simultaneous Localization and Mapping), in particular a graph SLAM, algorithm can be used to take the sensor data from one or more sensors of the vehicle as a basis for repeatedly determining the respective pose of the vehicle when the vehicle is traveling. The pose of the vehicle can be used to position landmarks identified on the basis of the sensor data, e.g. lane markings, in the environment of the vehicle in order to produce a map of the environment of the vehicle and/or in order to localize the vehicle within the environment.

When traveling along an approximately straight road, the roll angle of the vehicle along the whole trajectory typically cannot be determined clearly using the available sensor data (GNSS, odometry and/or camera sensor data). The reason for this is that (satellite-based) GNSS measurements typically permit only the position to be determined, but not the roll angle or pitch angle. Odometry measurements permit 6D information (3D translation+3D rotation) to be determined (which can be used as restrictions or conditions for the purposes of a graph SLAM algorithm). However, these relate only to changes between two times and do not permit an absolute orientation to be determined. The absolute roll angle of the vehicle along the trajectory thus cannot be determined if the trajectory is linear.

It may be assumed for the roll angle that the vehicle always moves on all four wheels parallel to ground level (i.e. on the tangential plane on the globe, perpendicular to the gravity vector). This assumption is often incorrect, however, because most roads are slightly inclined for drainage reasons. An incorrect assumption for the roll angle of the vehicle typically leads to errors in the localization and mapping brought about on the basis of the sensor data of the vehicle.

The present document is concerned with the technical object of determining pose data relating to the pose, in particular relating to the roll angle, of a vehicle efficiently and precisely, in particular in order to permit a precise localization and/or mapping on the basis of the sensor data recorded by the vehicle.

The object is achieved by the claimed invention. It is pointed out that additional features of a patent claim that is dependent on an independent patent claim may, without the features of the independent patent claim or only in combination with a subset of the features of the independent patent claim, form a separate invention that is independent of the combination of all the features of the independent patent claim and that can be turned into the subject matter of an independent claim, a divisional application or a subsequent application. This applies in the same way to technical teachings described in the description, which are able to form an invention that is independent of the features of the independent patent claims.

According to one aspect, a device for determining pose data relating to the pose of a (motor) vehicle is described. The term "pose data" is used here to denote data that describe the pose, e.g. at least one component of the pose, of a vehicle and/or that are related to the pose of a vehicle. The "pose data relating to the pose of a vehicle" may thus alternatively be referred to as "data relating to the pose of a vehicle".

The pose data relating to the pose can be determined (at a sequence of sampling times or sampling positions in each case) when the vehicle is traveling. The travel may involve the vehicle traveling in a straight line (without significant lateral acceleration of the vehicle). The pose data may indicate and/or comprise: the direction of the gravity vector (acting on the vehicle), in particular relative to the vertical axis of the vehicle in a vehicle coordinate system (i.e. in a coordinate system of the vehicle); and/or the estimate of the roll angle of the vehicle, in particular in a fixed coordinate system according to DIN ISO 8855. The device may be configured to determine pose data for any sampling time and/or for any sampling position from the sequence of sampling time or sampling positions. The device may be part of the vehicle and/or part of a vehicle-external server.

The device is configured to determine (at or for the respective sampling time) a measured value of the (total) acceleration vector of the vehicle. The measured value of the acceleration vector can be determined using an acceleration sensor, in particular using an inertial measurement unit (IMU), of the vehicle. The measured value of the acceleration vector is typically made up here of a dynamic component brought about by the movement, in particular by a change of movement (e.g. a longitudinal acceleration, braking, a lateral acceleration, etc.), of the vehicle and a gravitational component brought about by the gravitational field of the Earth. The gravitational component can be referred to as a gravity vector.

The device may be configured to determine the value of the dynamic component of the measured value of the acceleration vector (at or for the respective sampling time). The value of the dynamic component can be determined using sensor data from one or more vehicle sensors, in particular using a wheel speed sensor and/or using a velocity sensor, of the vehicle. Alternatively or additionally, the value of the dynamic component can be determined using sensor data from one or more environment sensors, in particular using image data from a camera (for instance by determining and evaluating the optical flow), of the vehicle. In particular, the value of the dynamic component can be determined using one or more odometry measurements of the vehicle.

The device may be configured to determine the value of the dynamic component using a dynamic model for the longitudinal and/or lateral and/or vertical acceleration of the vehicle that is brought about by the movement of the vehicle. The dynamic model may comprise a single-track model or be dependent on a single-track model. The sensor data from the one or more vehicle sensors and/or environment sensors of the vehicle can be used as input data for the dynamic model in order to determine the value of the dynamic component particularly precisely.

The device may furthermore be configured to take the measured value of the acceleration vector and the value of the dynamic component as a basis for determining an estimate of the gravity vector (at or for the respective sampling time). The vector value of the dynamic component can be deducted here from the vector measured value of the acceleration vector in order to determine the vector estimate of the gravity sensor. The pose data relating to the pose of the vehicle can then be determined efficiently and precisely on the basis of the estimate (of the direction) of the gravity vector.

The device may thus be configured to determine the direction of the gravity vector. The direction of the gravity vector can be indicated here relative to the coordinate system of the vehicle. Furthermore, it is possible to allow for the gravity vector being perpendicular to the Earth's surface (and thus the actual direction of the gravity vector corresponding to the (negative) z axis of the world coordinate system). The determined direction of the gravity vector (in the vehicle coordinate system) relative to the actual direction of the gravity vector (in the world coordinate system) can then be taken as a basis for inferring the roll angle of the vehicle (about the longitudinal axis of the vehicle).

The device may be configured to use a sliding window method to smooth the measured values of the acceleration vector, the values of the dynamic component and/or the estimates of the gravity vector (along the sequence of sampling times). In particular, the device may be configured to determine the measured value of the acceleration vector for a sampling time by using a sliding window method to smooth a sequence of unfiltered measured values of the acceleration vector for a corresponding sequence of times that relate to a period before, after and/or at the sampling time. Alternatively or additionally, the device may be configured to determine the value of the dynamic component for a sampling time by using a sliding window method to smooth a sequence of unfiltered values of the dynamic component for a corresponding sequence of times that relate to a period before, after and/or at the sampling time. Alternatively or additionally, the device may be configured to determine the estimate of the gravity vector for a sampling time by using a sliding window method to smooth a sequence of unfiltered estimates of the gravity vector for a corresponding sequence of times that relate to a period before, after and/or at the sampling time. Smoothing allows the quality of the determined pose data to be increased further.

The time window chosen for the sliding window method can be a time window that extends from one or more times before the sampling time up to the sampling time. Such a time window can be used in particular for an online determination of the pose data. Alternatively, a time window that is arranged around the sampling time (and that has one or more times before and one or more times after the sampling time) can be chosen. Such a time window can be used in particular for an off-line determination of the pose data (e.g. in a backend server).

The device may be configured to take the determined pose data as a basis for bringing about a mapping of the environment of the vehicle (for the respective travel) and/or a localization of the vehicle within the environment of the vehicle (for the respective travel). The vehicle may be driven along a specific route when traveling. The determined pose data can then be taken as a basis for bringing about the localization of the vehicle along the route and/or the mapping of the environment along the route.

The device may in particular be configured to determine pose data relating to the pose of the vehicle at a sequence of sampling times along a specific route while the vehicle is traveling. The pose data can then be taken as a basis for determining conditions and/or restrictions for a graph SLAM method for localizing the vehicle along the route and/or for mapping the environment of the vehicle along the route. The conditions and/or restrictions can each relate here to individual nodes of the graph used for the graph SLAM method. Taking account of the pose data for localization and/or mapping allows the quality of the localization and/or mapping to be increased efficiently.

The device may be configured to set a weighting for the conditions determined on the basis of the pose data for the purposes of the graph SLAM method according to the value of the dynamic component, in particular such that the weighting falls as the value, in particular as the value of the absolute value, of the dynamic component rises. In other words, the extent of the allowance for the conditions and/or restrictions determined on the basis of the pose data in the localization and/or mapping can be reduced as the value of the dynamic component rises (and thus as the uncertainty regarding the estimate of the gravity vector increases). As such, the quality of the localization and/or mapping can be increased further.

According to another aspect, a (road) motor vehicle (in particular a passenger vehicle or a truck or a bus or a motorcycle) that comprises the device described in this document is described.

According to another aspect, a vehicle-external unit, in particular a server, that comprises the device described in this document is described. The vehicle-external unit can receive the respective measured value from the acceleration sensor and/or the respective value of the dynamic component from one or more vehicles via a (wireless) communication connection. Alternatively or additionally, the vehicle-external unit may be configured to receive the sensor data from one or more vehicles (in particular sensor data relating to the odometry) via a communication connection. On the basis of this, the respective value of the dynamic component can then be computed by the vehicle-external unit.

According to another aspect, a method for determining pose data relating to the pose (in particular relating to the roll angle) of the vehicle is described. The method comprises determining at least one (vector) measured value of the (total) acceleration vector of the vehicle, and determining a (vector) value of the dynamic component of the measured value of the acceleration vector that is brought about by the movement, in particular by a change of movement (e.g. a longitudinal acceleration, braking, a lateral acceleration, etc.), of the vehicle. The measured value and the value can each be determined using the sensor data from one or more sensors of the vehicle.

The method furthermore comprises determining, on the basis of the measured value of the acceleration vector and on the basis of the value of the dynamic component, a (vector) estimate of the gravity vector (in particular an estimate of the direction of the gravity vector (relative to the vehicle coordinate system)). It is thus possible to determine the part of the measured value of the acceleration vector that is attributable (exclusively) to gravity acting on the vehicle.

In addition, the method can comprise determining pose data relating to the pose of the vehicle on the basis of the estimate (of the direction) of the gravity vector.

According to another aspect, a software (SW) program is described. The SW program can be configured to be executed on a processor, and to thereby carry out the method described in this document.

According to another aspect, a storage medium is described. The storage medium can comprise a SW program that is configured to be executed on a processor, and to thereby carry out the method described in this document.

It should be noted that the methods, devices and systems described in this document may be used either alone or in combination with other methods, devices and systems described in this document. In addition, any aspects of the methods, devices and systems described in this document may be combined with one another in a variety of ways. In particular, the features of the claims may be combined with one another in a variety of ways. Furthermore, features shown between parentheses may be understood as optional features.

The invention is described in more detail below on the basis of exemplary embodiments.

DETAILED DESCRIPTION OF THE DRAWINGS

Figure 1A:
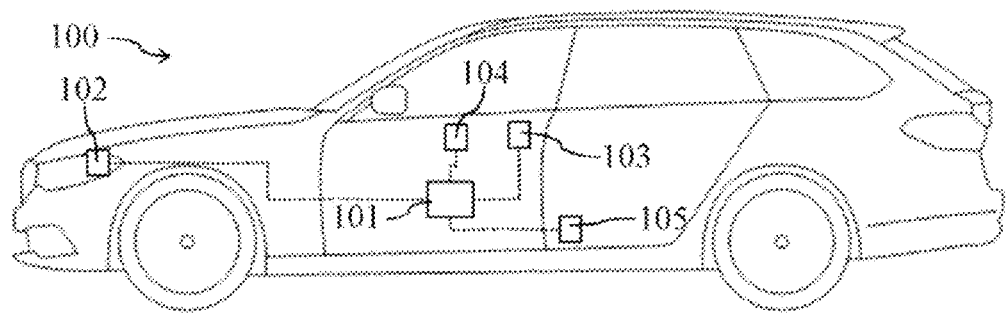
FIG. 1a shows an illustrative vehicle.

As explained at the outset, the present document is concerned with efficiently and precisely determining pose data relating to the pose of a vehicle 100. In this context, FIG. 1 shows an illustrative vehicle 100 that comprises one or more environment sensors 102. Illustrative environment sensors 102 are a camera, a radar sensor, a lidar sensor, an ultrasonic sensor, etc. The one or more environment sensors 102 are configured to record environmental data (i.e. sensor data) relating to the environment of the vehicle 100.

The vehicle 100 furthermore comprises a position sensor 104 that is configured to use a global satellite-based navigation system (GNSS), e.g. to use GPS, to determine position data (i.e. sensor data) relating to the position of the vehicle 100 in a world coordinate system.

In addition, the vehicle 100 comprises one or more vehicle sensors 103 that are configured to determine sensor data, e.g. the speed of travel, the steering angle, the longitudinal acceleration, the lateral acceleration, that permit an odometry-based determination of the position and/or the pose of the vehicle 100.

Additionally, the vehicle 100 comprises an acceleration sensor 105 that is configured to determine measured values relating to a (three-dimensional) acceleration vector of the vehicle 100. The acceleration sensor 105 can comprise e.g. an inertial measurement unit (IMU).

Figure 1B:
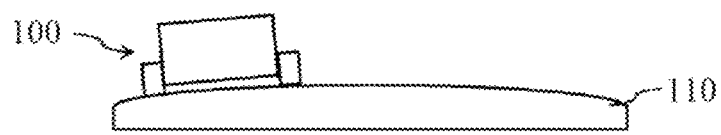
FIG. 1b shows an illustrative roadway.

As shown in FIG. 1b, the vehicle 100 can move on a roadway 110 that has a camber transversely with respect to the direction of travel of the roadway 110 (which runs perpendicular to the image plane). Such a camber may be intended to permit surface water to reliably flow away. The camber of the roadway 110 leads to the vehicle 100 exhibiting a rotation about the longitudinal axis of the vehicle 100 (i.e. a nonzero roll angle in terms of the plane defined by the x axis and the y axis of a world coordinate system) when traveling on the roadway 110. In particular, the vertical axis of the vehicle 100 and the gravity vector (perpendicular to the Earth's surface) are not arranged parallel to one another in such a case.

Figure 1C:
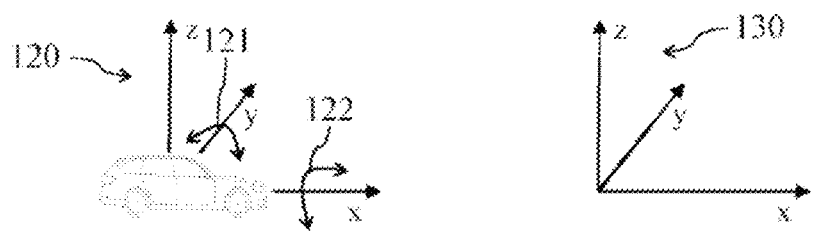
FIG. 1c shows illustrative coordinate systems for determining the pose of a vehicle.

FIG. 1c shows an illustrative vehicle coordinate system 120 and an illustrative world coordinate system 130. The vehicle 100 may be skewed about the vertical axis (i.e. the z axis), about the longitudinal axis (i.e. the x axis) and/or about the transverse axis (i.e. the y axis) with respect to the world coordinate system 130. Consequently, the vehicle 100 (or the vehicle coordinate system 120) may have a nonzero pitch angle 121 and/or a nonzero roll angle 122 and/or a nonzero rotation angle (i.e. yaw angle) with respect to the world coordinate system 130.

If, during localization and/or mapping on the basis of the sensor data of the vehicle 100, the assumption is made that the vehicle 100 has all four wheels on the x-y plane of the world coordinate system 130, or in other words if it is assumed that the z axis of the vehicle coordinate system 120 is arranged parallel and points in the same direction as the z axis of the world coordinate system 130, this can lead to errors in the localization and/or mapping if the assumption is incorrect (e.g. due to the camber of a roadway 110).

If the vehicle 100 is traveling on a cambered road 110, for example, as shown in FIG. 1b, and is heading out of the image plane toward the onlooker, the vehicle 100 will observe the surroundings of the vehicle 100 in the relative coordinate system 120 of the vehicle. If the assumption of an uncambered, level road 110 is made during mapping, this leads to the evaluation of the sensor data of the vehicle 100 resulting in the vehicle 100 being effectively rotated about the longitudinal axis until the z axis of the vehicle 100 matches the z axis of the world coordinate system 130. When evaluating the relative observations of the vehicle 100 at different times and/or places, this leads to landmarks on the right-hand side of the vehicle 100 being mapped too high and those on the left-hand side being mapped too low. The error increases here as the distance from the vehicle longitudinal axis increases.

Figure 1D:
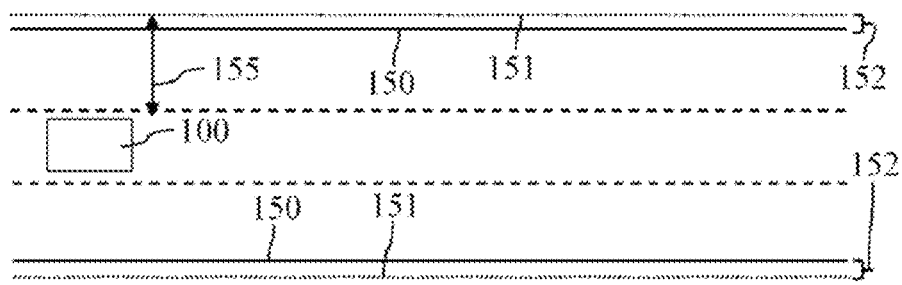
FIG. 1d shows illustrative localization errors due to incorrect assumptions relating to the roll angle of the vehicle.

FIG. 1d shows an illustrative vehicle 100 traveling on a linear roadway 110 with road markings 150 as landmarks. The road markings 150 can be detected by the one or more environment sensors 102 of the vehicle 100. The environmental data from the one or more environment sensors 102 can be taken as a basis here for determining the lateral distance 155 between the vehicle 100 and a detected road marking 150, in order to position the respective road marking 150 in a map relating to the environment of the vehicle 100.

If, when determining the lateral distance 155 of the road marking 150, it is assumed that the roll angle 122 of the vehicle 100 is zero and the vehicle 100 thus has no skew about the x axis of the vehicle coordinate system 120, even though a skew actually exists, this can lead to a mismatch 152 between the actual position of the road marking 150 and the estimated position 151 of the road marking 150. Errors in the determination of the roll angle 122 can thus lead to errors in the localization and/or mapping on the basis of the sensor data of a vehicle 100.

The present document is therefore concerned with reducing inaccuracies in the localization and/or mapping of landmarks by way of sensor data comprising fleet data from vehicles 100 on roads having an approximately straight course, e.g. freeways or highways. Such inaccuracies typically do not occur much on roads having a non-straight course, because the relative observations of the odometry together with the GNSS measurements for curves form a lever arm that can affect the roll angle of the trajectory of the respective vehicle 100 and can thus be used to determine the absolute value of the roll angle 122.

The assumption that the vehicle vertical axis always runs normally to the tangential plane on the globe is incorrect due to the cross-inclination and/or camber of roadways 110 that often exists. Using this incorrect assumption can lead to the position of landmarks 150, in particular in terms of the height of the landmarks 150, being determined incorrectly. In addition, the association of landmarks 150 detected on different journeys in opposite directions of travel can be hampered by the incorrectly determined positions.

An (evaluation) device 101 of the vehicle 100 may be configured to take the sensor data from one or more sensors 102, 103, 104, 105 of the vehicle 100, in particular using an acceleration sensor 105, as a basis for determining a measured value of the (total) acceleration vector of the vehicle 100. The acceleration vector can have a specific absolute value and a specific direction (within a three-dimensional space) here. If the vehicle 100 were stationary, the acceleration vector would correspond to the gravity vector (which is perpendicular to the Earth's surface). The direction of the gravity vector can then be used to directly infer the roll angle 122 of the vehicle 100 (in terms of the x axis running at a tangent to the Earth's surface).

However, the acceleration sensor 105 of the vehicle 100 typically does not record the gravity vector directly, but rather the sum of all accelerations of the vehicle 100. In particular, the gravity vector is overlaid here with the additional accelerations acting on the vehicle 100. In particular at relatively high velocities, the vehicle 100 may experience here additional accelerations in all spatial directions (e.g. when cornering and/or when braking, etc.).

The roll angle 122 of the vehicle 100 thus typically cannot be estimated using purely relative odometry measurements (e.g. from the wheel speeds and/or from the yaw rates) if the trajectory has a straight course. On the other hand, measured acceleration vectors can be used to determine the roll angle 122, wherein for this purpose the gravity vector can be estimated from the measured acceleration vectors and if necessary used in the trajectory optimization.

Figure 2:
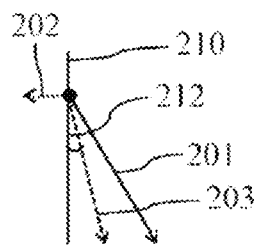
FIG. 2 shows an illustrative compensation for the measured acceleration vector for estimating the gravity vector and the roll angle.

FIG. 2 shows an illustrative acceleration vector 201 that has been recorded e.g. using the acceleration sensor 105 of the vehicle 100. In addition, FIG. 2 shows the vertical axis 210 of the vehicle 100. Furthermore, FIG. 2 shows a dynamic acceleration component 202 brought about by the inherent movement of the vehicle 100. The measured acceleration vector 201 can be compensated with the dynamic acceleration component 202 in order to estimate the gravity vector 203. The alignment of the gravity vector 203 relative to the vertical axis 210 of the vehicle 100 can be taken as a basis for determining an estimate 212 of the roll angle 122 of the vehicle 100.

Acceleration vector measurements can thus be used as an additional source of information for determining the roll angle 122 of individual vehicle orientations and therefore also the roll angle 122 of a whole travel trajectory. A kinematic model and the translational and rotational velocities of the vehicle 100 that are determined on the basis of the odometry of the vehicle 100 can be used to determine the acceleration component 202 resulting from the dynamics of the vehicle 100. The gravity vector 203 can then be determined by deducting the dynamic component 202 from the measured total acceleration 201 of the vehicle 100. The gravity vector 203 can be used as an additional prior (i.e. as an additional condition and/or restriction) for the orientation of the vehicle 100 in the factor graph of a SLAM optimization.

By way of example, a vehicle trajectory can be determined (for localization) on the basis of GPS, odometry and acceleration measurements. The dynamic components 202 of the accelerations can be computed from odometry measurements. In combination with the raw acceleration measurements 201, these can be used, as described above, to determine the pure gravity vectors 203 for each measurement. A graph SLAM optimization (with least squares optimization) can be used for the localization (e.g. in a backend server). For this purpose, the problem can be formulated as a factor graph representation. The optimization using a framework such as $g^2o$ can deliver the trajectory that is to be determined.

The additional gravity vectors 203 in the factor graph representation can be used as priors for the respective vehicle poses. The priors can describe here an additional restriction for the orientation of the vehicle pose relative to the negative z axis of the local coordinate system 130 of the assumed gravity.

Figure 3:
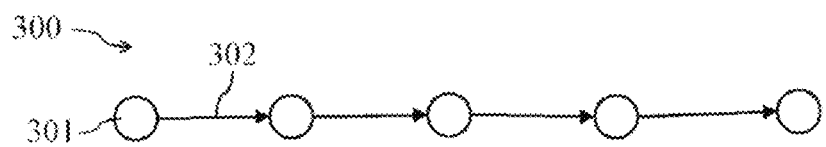
FIG. 3 shows an illustrative graph for localization and mapping.

FIG. 3 shows an illustrative graph 300 comprising a plurality of nodes 301, some of which are connected to one another by edges 302. Each node 301 can describe here the respective pose of the vehicle 100 (e.g. at different sampling points and/or sampling times along the trajectory taken by the vehicle 100). The edges 302 can describe one or more conditions relating to the transition between two nodes 301. The one or more conditions can be determined on the basis of the sensor data from the one or more sensors 102, 103, 104, 105 of the vehicle 100. At least one condition can relate here to the respectively estimated gravity vector 203 or to the respectively estimated roll angle 122 of the vehicle 100.

Alternatively or additionally, one or more conditions can be taken into account for each of the individual nodes 301 in the graph 300. In other words, the individual nodes 301 of the graph 300 may each have one or more conditions that relate (solely) to the respective node 301 (in particular to the pose of the vehicle 100 at the respective node 301). In a preferred example, at least one condition for the individual nodes 301 can relate here to the respectively estimated gravity vector 203 or to the respectively estimated roll angle 122 of the vehicle 100 (at the respective node 301). A condition that relates to a variable (of a node 301) (and not to the transition between two variables (i.e. to an edge 302)) is typically referred to as a "prior".

The nodes 301, or the poses of the vehicle 100 that are associated therewith, can be determined using an optimization method such that the conditions associated with the individual edges 302 are met as well as possible according to a specific error function (e.g. according to a least squares error function).

The acceleration vectors 201 measured when traveling can be smoothed using a sliding window method before use. Alternatively or additionally, the resulting gravity vectors 203 can be smoothed using a sliding window method before use. As such, the quality of the determined pose data relating to the pose of the vehicle 100 when traveling can be increased further.

The covariance matrices (i.e. the weightings) of the priors relating to the gravity vector 203 can be chosen according to the dynamics of the vehicle 100 that exist in each case. In particular, the covariance matrices of the additional priors can be chosen to be relatively large in highly dynamic situations (e.g. drift, emergency braking, very fast cornering) in order to allow for relatively increased uncertainty regarding the gravity vector estimation in such situations and in order to reduce the influence on the optimization result accordingly.

As explained earlier on, a kinematic model can be used to determine the dynamic part 202 of the measured acceleration 201 from odometry measurements. The single-track model can be used to compute the dynamic acceleration components 202 as follows:

$$a_x = \frac{\partial v}{\partial t}\cos(\beta) - \frac{v^2}{R}\sin(\beta)$$

$$a_y = \frac{\partial v}{\partial t}\sin(\beta) - \frac{v^2}{R}\cos(\beta)$$

where v is the absolute velocity of the vehicle 100, $\beta$ is the slip angle of the vehicle 100 and R is the radius on which the vehicle moves. The aforementioned variables can be determined on the basis of odometry measurements. When traveling in a straight line, $R\to\infty$, and so the second term can be ignored in each case if necessary.

For the slip angle, it holds that:

$$\beta = \arctan\left(\frac{v_y}{v_x}\right)$$

with:

$$v_x = \frac{\partial x}{\partial t} \approx \frac{dx}{dt}$$

$$v_y = \frac{\partial y}{\partial t} \approx \frac{dy}{dt}$$

dt here can be e.g. the time interval between two sensor measurements, in particular sampling times (e.g. 111 ms). dx and dy describe the movement (in particular the movement distance) of the vehicle 100 in the longitudinal direction or in the transverse direction during this time interval. dx and dy can be measured using the odometry, e.g. as a combination of the measured values from wheel speed sensors and visual odometry from the optical flow in images from a vehicle camera. A measured value of the slip angle can thus be determined on the basis of the sensor data from one or more sensors 102, 103 of the vehicle 100.

To compute the centripetal acceleration $$a_z = \frac{v^2}{R},$$

the absolute velocity of the vehicle 100 can be determined, as $$v = \sqrt[2]{v_x^2 + v_y^2}$$

The differential equation of the slip angle change $$\frac{1}{R} = \frac{d(\beta + \psi)}{du}$$

with the translation length $du \approx \sqrt[2]{d_x^2 + d_y^2}$
and with the aforementioned absolute velocity $$v = \sqrt[2]{v_x^2 + v_y^2} \approx \frac{du}{dt}$$

results in the following for the centripetal acceleration:

$$\frac{v^2}{R} = v^2 * \frac{\frac{d(\beta+\psi)}{dt}}{\frac{du}{dt}} \approx \frac{\frac{\partial\beta}{\partial t} + \frac{\partial\psi}{\partial t}}{v}$$

The slip angle change $\partial\beta/\partial t$ can be better aligned with successive time stamps by the change in the computed slip angles:

$$\frac{\partial\beta}{\partial t} \approx \frac{\beta_{t_2}}{t_2 - t_1} = \frac{\beta_{t_2} - \beta_{t_1}}{dt}$$

The change in the yaw angle can be better aligned directly from the odometry:

$$\frac{\partial\psi}{\partial t} \approx \frac{d\psi}{dt}$$

Insertion into the formulae specified above allows the dynamic accelerations 202 in the x and y directions of the vehicle 100 to be determined. Accordingly, the dynamic accelerations 202 in the three-dimensional space can be determined.

Figure 4:
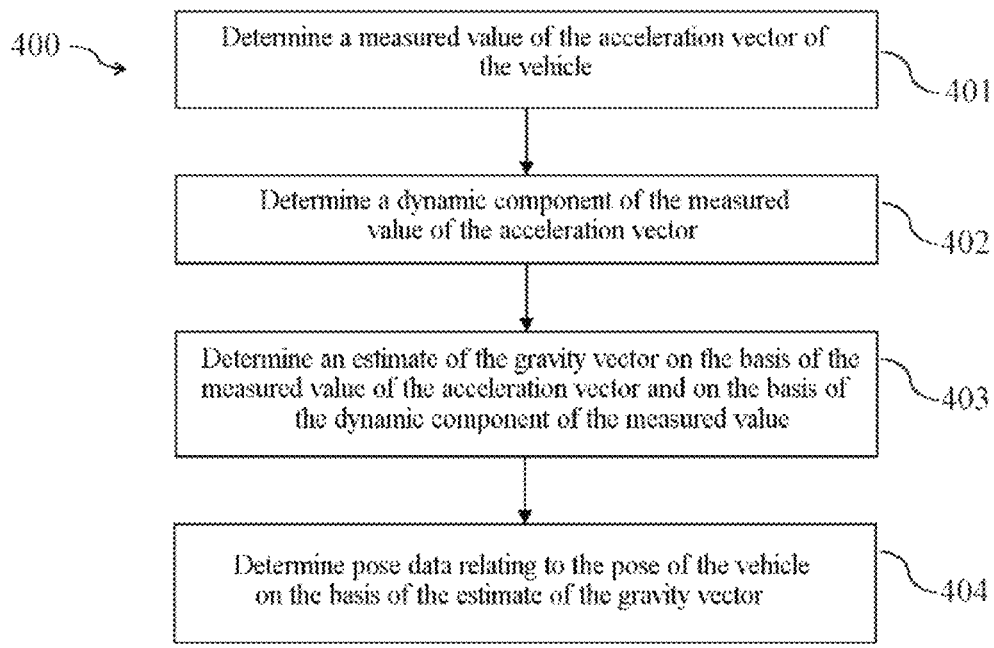
FIG. 4 shows a flowchart for an illustrative method for determining pose data relating to the pose of a vehicle.

FIG. 4 shows a flowchart for an illustrative (if necessary computer-implemented) method 400 for determining pose data relating to the pose of a vehicle 100. The pose of the vehicle 100 can comprise the position of the vehicle 100 in the three-dimensional space (in particular in the world coordinate system 130). Alternatively or additionally, the pose of the vehicle 100 can comprise an alignment and/or a rotation of the vehicle 100 in the three-dimensional space (in particular in the world coordinate system 130). The alignment and/or rotation of the vehicle 100 can comprise here in particular a roll angle 122 about the longitudinal axis of the vehicle 100. The method 400 can be carried out repeatedly, in particular periodically, at or for a respective sampling time.

The method 400 comprises determining 401 a measured value of the (total) acceleration vector 201 of the vehicle 100 (at or for the respective sampling time). If necessary, the measured value can be recorded directly using an acceleration sensor 105 of the vehicle 100.

In addition, the method 400 comprises determining 402 (for or at the respective sampling time) a value of the dynamic component 202 of the measured value of the acceleration vector 201 that is brought about by the movement of the vehicle 100. The value of the dynamic component 202 can be determined here on the basis of the sensor data from one or more vehicle sensors 103 and/or environment sensors 102 of the vehicle 100. In particular, one or more odometry measurements can be used to determine the value of the dynamic component 202.

The method 400 furthermore comprises determining 403, on the basis of the measured value of the acceleration vector 201 and on the basis of the value of the dynamic component 202, an estimate of the gravity vector 203 (at or for the respective sampling time). The (vector) value of the dynamic component 202 can be deducted here from the (vector) measured value of the acceleration vector 201 in order to determine the (vector) estimate of the gravity vector 203.

In addition, the method 400 can comprise determining 404 pose data relating to the pose of the vehicle 100 on the basis of the estimate of the gravity vector 203, in particular on the basis of the direction of the estimate of the gravity vector 203. The pose data can comprise here e.g. an estimate 212 for the roll angle 122 of the vehicle 100 (at or for the respective sampling time). The estimate 212 of the roll angle 122 can be determined e.g. on the basis of the direction of the estimate of the gravity vector 203 relative to the direction of the vertical axis 210 of the vehicle 100.

The pose data can be used e.g. for operating the vehicle 100. Alternatively or additionally, the pose data can be used to determine the vehicle trajectory and/or to map the environment of the vehicle 100.

The measures described in this document allow pose data relating to the pose of a vehicle 100 to be determined efficiently and precisely even when traveling linearly.

The present invention is not limited to the exemplary embodiments shown. In particular, it should be noted that the description and the figures are intended to illustrate the principle of the proposed methods, devices and systems only by way of illustration.

The invention claimed is:

1. A device for determining pose data relating to a pose of a vehicle, wherein the device is configured:
   to determine a measured value of an acceleration vector of the vehicle;
   to determine a value of a dynamic component of the measured value of the acceleration vector that is brought about by a movement of the vehicle;
   to take the measured value of the acceleration vector and the value of the dynamic component as a basis for determining an estimate of a gravity vector; and
   to determine the pose data relating to the pose of the vehicle based on the estimate of the gravity vector.

2. The device according to claim 1, wherein the device is further configured to determine the measured value of the acceleration vector using an acceleration sensor of the vehicle.

3. The device according to claim 2, wherein the acceleration sensor is an inertial measurement unit.

4. The device according to claim 1, wherein the device is further configured:
   to determine the value of the dynamic component using sensor data from one or more vehicle sensors of the vehicle;
   to determine the value of the dynamic component using sensor data from one or more environment sensors of the vehicle; and/or
   to determine the value of the dynamic component using one or more odometry measurements of the vehicle.

5. The device according to claim 4, wherein the one or more vehicle sensors comprise a wheel speed sensor and/or a velocity sensor.

6. The device according to claim 4, wherein the sensor data from the one or more environmental sensors comprises image data from a camera.

7. The device according to claim 1, wherein:
   the device is further configured to determine the value of the dynamic component using a dynamic model for a longitudinal, lateral and/or vertical acceleration of the vehicle that is brought about by the movement of the vehicle; and
   the dynamic model comprises a single-track model or is dependent on the single-track model.

8. The device according to claim 1, wherein the device is further configured:
   to determine the measured value of the acceleration vector for a first sampling time by using a first sliding window method to smooth a sequence of unfiltered measured values of the acceleration vector for a corresponding sequence of first times that relate to a first period before, after and/or at the first sampling time;
   to determine the value of the dynamic component for a second sampling time by using a second sliding window method to smooth a sequence of unfiltered values of the dynamic component for a corresponding sequence of second times that relate to a second period before, after and/or at the second sampling time; and/or
   to determine the estimate of the gravity vector for a third sampling time by using a third sliding window method to smooth a sequence of unfiltered estimates of the gravity vector for a corresponding sequence of third times that relate to a third period before, after and/or at the third sampling time.

9. The device according to claim 1, wherein the pose data indicate:
   a direction of the gravity vector relative to a vertical axis of the vehicle in a vehicle coordinate system; and
   an estimate of a roll angle of the vehicle in a fixed coordinate system according to DIN ISO 8855.

10. The device according to claim 1, wherein the pose data indicate:
    a direction of the gravity vector; and
    an estimate of a roll angle of the vehicle.

11. The device according to claim 1, wherein the device is further configured to take the determined pose data as a basis for bringing about a mapping of an environment of the vehicle and/or a localization of the vehicle within the environment of the vehicle.

12. The device according to claim 1, wherein the device is further configured:
    to determine the pose data relating to the pose of the vehicle at a sequence of sampling times while the vehicle is traveling along a route; and
    to take the pose data as a basis for determining conditions for a graph SLAM method for localizing the vehicle along the route and/or for mapping an environment of the vehicle along the route.

13. The device according to claim 12, wherein the device is further configured to set a weighting for the conditions determined on the basis of the pose data for purposes of the graph SLAM method according to the value of the dynamic component, such that the weighting falls as a value of an absolute value of the dynamic component rises.

14. A method for determining pose data relating to a pose of a vehicle, the method comprising:
    determining at least one measured value of an acceleration vector of the vehicle;
    determining a value of a dynamic component of the measured value of the acceleration vector that is brought about by a movement of the vehicle;
    determining, based on the measured value of the acceleration vector and based on the value of the dynamic component, an estimate of a gravity vector; and
    determining the pose data relating to the pose of the vehicle based on the estimate of the gravity vector.

* * * * *